US007916296B2

(12) United States Patent
Schultz

(10) Patent No.: US 7,916,296 B2
(45) Date of Patent: Mar. 29, 2011

(54) METHOD AND APPARATUS FOR ADJUSTING A COLOR POINT OF A LIGHT SOURCE

(75) Inventor: Volkmar Schultz, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 288 days.

(21) Appl. No.: 12/305,388

(22) PCT Filed: Jun. 11, 2007

(86) PCT No.: PCT/IB2007/052194

§ 371 (c)(1), (2), (4) Date: Dec. 18, 2008

(87) PCT Pub. No.: WO2007/148254

PCT Pub. Date: Dec. 27, 2007

(65) Prior Publication Data

US 2009/0279293 A1 Nov. 12, 2009

(30) Foreign Application Priority Data

Jun. 21, 2006 (EP) .................................... 06115800

(51) Int. Cl.
*G01J 3/46* (2006.01)

(52) U.S. Cl. ............. 356/402; 362/227; 353/94; 353/85

(58) Field of Classification Search .......... 356/402–425; 362/227–249.07; 315/291–311; 353/85, 353/94

See application file for complete search history.

(56) References Cited

U.S. PATENT DOCUMENTS

| | | | | |
|---|---|---|---|---|
| 6,552,495 | B1 | 4/2003 | Chang | |
| 6,583,791 | B2 | 6/2003 | Berryman et al. | |
| 7,023,543 | B2 * | 4/2006 | Cunningham | 356/300 |
| 2002/0180973 | A1 | 12/2002 | MacKinnon et al. | |
| 2004/0036668 | A1 | 2/2004 | Nakanishi | |

FOREIGN PATENT DOCUMENTS

| | | |
|---|---|---|
| FR | 2878064 | 5/2006 |
| JP | 2001272938 | 10/2001 |

* cited by examiner

*Primary Examiner* — Tarifur Chowdhury
*Assistant Examiner* — Abdullahi Nur

(57) ABSTRACT

Meeting a target color point using more than 3 primary light sources is achieved by calculating permutations of light sources, calculating for each of the permutations the contributions of the light sources to meet the color point, adding up the contributions of the light sources separately into an overall contribution, and operating the light sources according to their overall contributions.

12 Claims, 5 Drawing Sheets

| | $T_1$ | $T_2$ | $T_3$ | $T_4$ | $T_5$ | $T_6$ | $T_7$ | $T_8$ | $T_9$ | $T_{10}$ |
|---|---|---|---|---|---|---|---|---|---|---|
| A (118a) | $D_{A1}$ | $D_{A2}$ | $D_{A3}$ | $D_{A4}$ | $D_{A5}$ | $D_{A6}$ | | | | |
| B (118b) | $D_{B1}$ | $D_{B2}$ | $D_{B3}$ | | | | $D_{B7}$ | $D_{B8}$ | $D_{B9}$ | |
| C (118c) | $D_{C1}$ | | | $D_{C4}$ | $D_{C5}$ | | $D_{C7}$ | $D_{C8}$ | | $D_{C10}$ |
| D (118d) | | $D_{D2}$ | | $D_{D4}$ | | $D_{D6}$ | $D_{D7}$ | | $D_{D9}$ | $D_{D10}$ |
| E (118e) | | | $D_{E3}$ | | $D_{E5}$ | $D_{E6}$ | | $D_{E8}$ | $D_{E9}$ | $D_{E10}$ |

FIG. 3

METHOD AND APPARATUS FOR ADJUSTING A COLOR POINT OF A LIGHT SOURCE

This application is a national stage application under 35, U.S.C. §371, of international Application No. PCT/IB2007/052194, filed on Jun. 11, 2007, and published in the English language on Dec. 27, 2007, as international Publication No. WO/2007/148254, which claims priority to European Application No. 06115800.2, filed on Jun. 21, 2006, incorporated herein by reference.

TECHNICAL FIELD

The present patent application relates in general to adjusting a color point of a lamp.

BACKGROUND

Solid-state lighting (SSL) devices, such as light-emitting diodes (LEDs), are used in current lighting systems. These LEDs provide light at a certain wavelength. in order to operate the lamp with different colors, differently colored LEDs are assembled within one single lamp. The LEDs, when operated, provide the primary colors, which are superposed to create the output color of the lamp.

The LEDs may define an area within the color space indicating the color that can be realized by the lamp through linear combinations of the fluxes of the LEDs. Adjusting the flux of each LED so as to contribute to the overall color of the lamp is known in the art for lamps comprising three LEDs. It is known that there is an exact relation between a target color point, for example defined by tristimulus values ($X_t$, $Y_t$, $Z_t$), and the average flux $\overline{\Phi}$ of three primary colors. It is also known that the average flux $\overline{\Phi}$ can be defined by the duration a LED is operated. For example, in pulse width modulation (PWM) based systems, the average flux $\overline{\Phi}_i$, of the $i^{th}$, color can be given by $\overline{\Phi}_i=\hat{\Phi}_i p_i$, with $p_i$, representing the duty cycle (duration of operation in one period divided by total length of period) of the $i^{th}$, primary color and $\hat{\Phi}_i$, the peak value of the flux. Within a three-color system, i.e. lamps with three different primary colors, the duty cycle for each of the primary colors required for obtaining one given color point can thus be calculated.

However, it is not possible in the art to calculate the contribution of a primary color to obtain a target color point if more than three primary colors are used in a lamp.

Therefore, it is a first object of the present patent application to provide an easy color point calculation. Another object of the present patent application is to provide a lamp, which emits light with a high color-rendering index. Another object of the present patent application is to provide an easy implementation of color point calculation. Another object of the present patent application is to provide a color point calculation using pulse width modulated systems.

SUMMARY

These and other objects of the patent application are achieved by a method of adjusting a color point of a lamp, which method comprises: defining a target color point, operating N different light sources within the lamp, which light sources emit light of different wavelengths, and adjusting the contributions of M out of the N light sources to the overall light to be emitted by the lamp so as to meet said target color point, wherein said adjusting comprises calculating $$\binom{N}{M}$$

permutations of combinations of light sources, calculating for at least two of the calculated permutation the contributions of the light sources to the overall light emitted by the lamp to meet the color point, adding up the calculated contributions of each light source from at least two of the calculated permutations into an overall contribution of each light source separately, and operating the lamp with the resulting overall contributions of all light sources.

It has been found that a target color point can be met with lamps having a plurality of different light sources by adding the contributions of the light sources for at least two permutations to an overall contribution, and operating the light sources according to their own overall contributions. It is particularly useful to define the target color point in the CIE xyz color space, also known as the CIE 1931, color space. According to this definition, the human eye has receptors for different wavelengths, for example blue, green, and red. These three parameters can thus be sufficient in principle to describe a color sensation. To describe a color point that gives a good color sensation to a human eye, tristimulus values, denoted X, Y, and Z values, may be used, which describe a triplet of red, green, and blue, respectively. It has been found that colors perceptible to human eye are to be found within the color triangle defined by the X, Y, Z values.

Even though a target color point may be met by adding the contributions of one possible combination of light sources, it has further been found that the color appearance of such a lamp may have a low color-rendering index. The color-rendering index may be used as a quality distinction between light sources emitting light of the same color. A reference source, such as a black body radiator, may be defined as having a color-rendering index of 100. The test source with the same color temperature is compared with this, and the perceived colors under the reference source and under the test illumination, i.e. measured in the CIE color space, may be compared using a standard formula. Therefore, the present patent application provides a calculation of possible permutations of combinations of light sources to meet the target color point. With N different light sources, and using M of these to meet a color point, it will be possible to calculate $$\binom{N}{M},$$

preferably $$\binom{N}{3}$$

permutations of combinations of light sources. Calculating permutations of combinations may comprise calculating $$\binom{N}{3} = \frac{N!}{(N-3)!3!}$$

permutations.

For each of these permutations, the contributions of M of the N different light sources to meet the target color point can be calculated. Then, after having calculated the contribution of each of the N light sources for the permutations, the contributions of all light sources from the different permutations are summed to obtain an overall contribution. This overall contribution accounts for all contributions of a light source within the different permutations. Having obtained the overall contributions of each of the light sources separately, the lamp may be operated by operating each of the light sources with its overall contribution. This leads to an emission of light meeting the target color point and having a high color-rendering index.

The method according to the invention provides a color point calculation for lamps with N being more than 2, preferably 3. light sources, in particular solid-state light sources, such as LEDs. The calculation of the contribution of each of the light sources is easy and fast. The algorithm allows easy implementation.

It has been found that a lamp with N=4, different light sources provides good color rendering index results. Preferably, N=5, light sources provide an even better color rendering index. For example, a light source having the colors red, green, blue, amber, and yellow may be used.

The calculation of the contributions is preferred with M, being equal to or greater than 3, out of N light sources contributing to the overall light within one permutation.

The contribution of a light source to the overall light may be understood as the flux of each light source. Adding the fluxes of the different light sources of each of the permutations may result in meeting the target color point.

in particular in pulse width modulated systems, the contribution of each light source may be understood as the duration of activation of the light source within a time frame. It is particularly preferred to calculate a pulse width duty cycle for each light source within each of the permutations to meet the target color point.

As was indicated above, the color triangle of the tristimulus values defines the area of target color points which are perceptible to humans. Therefore, it is preferred to consider the visibility of each of the permutations, i.e. whether the superposed contributions of M light sources found within a permutation are within the color triangle, and thus can be seen by viewers. In this respect, it is preferred that the calculated duty cycle of each of the light sources is between 0, and 1.

After a check as to which solutions are capable of providing a target color point which is within the color triangle and which requires duty cycles in the range between 0, and 1, a number of possible solutions m is obtained. With this number m a virtual pulse width modulation cycle $$T_i = \frac{T}{m}$$

can be assumed, where T represents a period of the PWM system. The contributions of each of the light sources may be scaled to this virtual pulse width modulated cycle $T_i$. The fixed, identical time frame for each permutation may thus be $T_i$, and the duty-cycle for each of the light sources may be $p_i$. This may result in a weighted superposition of the overall contributions of the light source being calculated to $$p_i = \frac{1}{m}\sum_{k=1}^{m} p_{ik}$$

To obtain a good color-rendering index, the lamp may then be operated with the overall contributions of all of the light sources within each of the fixed pulses of the pulse width modulation cycles T. The color rendering may also be improved in that a pulse width duty cycle is calculated for each light source within a non-identical time frame for each permutation.

Another aspect of the present patent application is a device for operating a lamp, comprising a target color point definition unit, adjusting means arranged for adjusting the contribution of M out of N different light sources to the overall light emitted by the lamp so as to meet the target color point, permutation means arranged for calculating $$\binom{N}{M}$$

permutations of combinations of light sources, calculation means arranged for calculating for at least two of the calculated permutation the contributions of the light sources to the overall light emitted from the lamp to meet the target color point, and adding means arranged for adding the calculated contributions of each light source from at least two of the calculated permutations into an overall contribution of each light source separately.

A further aspect of the present patent application is system comprising a lamp with N different light sources emitting light of different wavelengths, and a device of claim 12.

These and other aspects of the present patent application will be apparent from and elucidated with reference to the following Figures.

BRIEF DESCRIPTION OF THE DRAWINGS in the Figures.

FIG. 3 is a Table illustrating permutations according to embodiments;

Figure 4A:
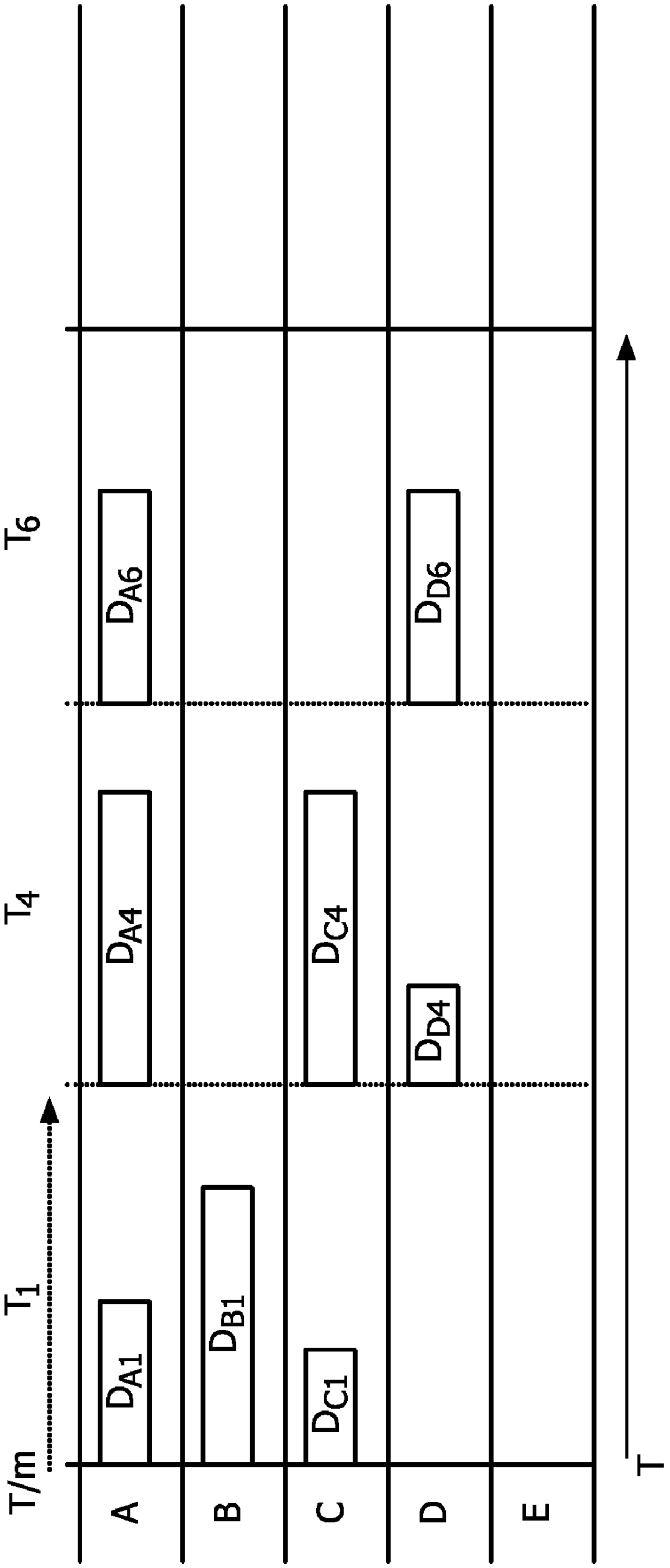
Figure 4B:
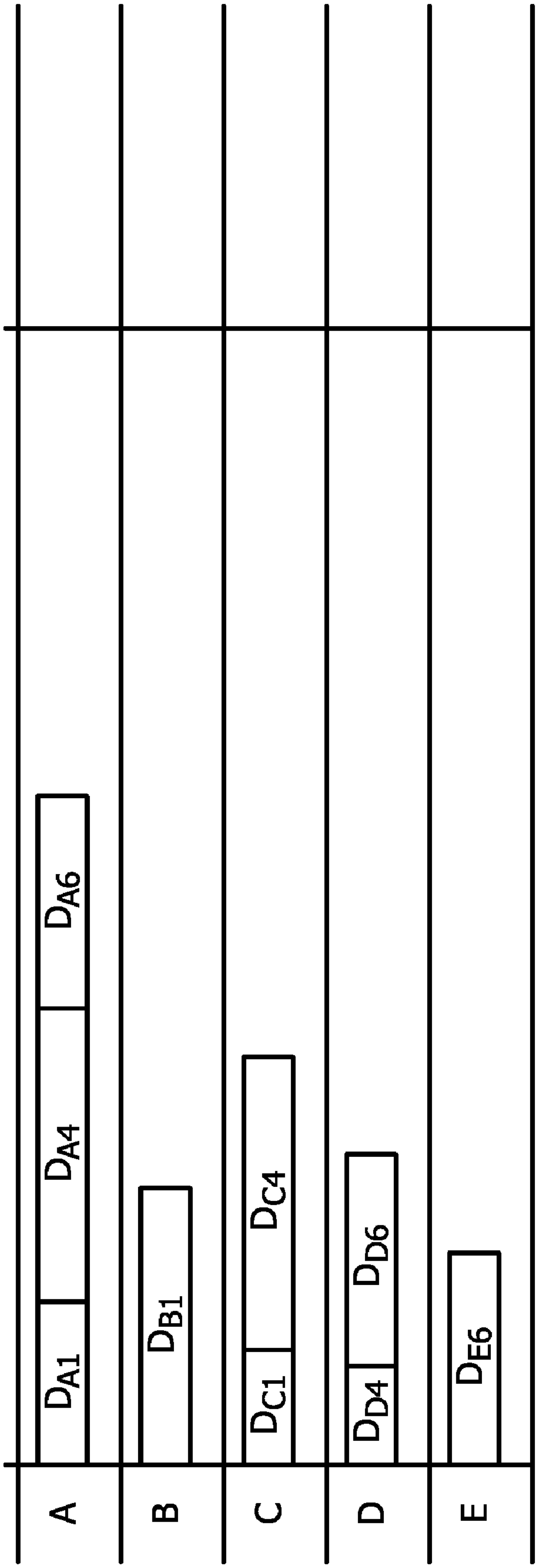

FIG. 4*a*, is a chart illustrating the duty cycles of light sources according to permutations;

FIG. 4*b*, is a chart illustrating the cumulated duty-cycles.

DETAILED DESCRIPTION OF THE DRAWINGS

Figure 1:
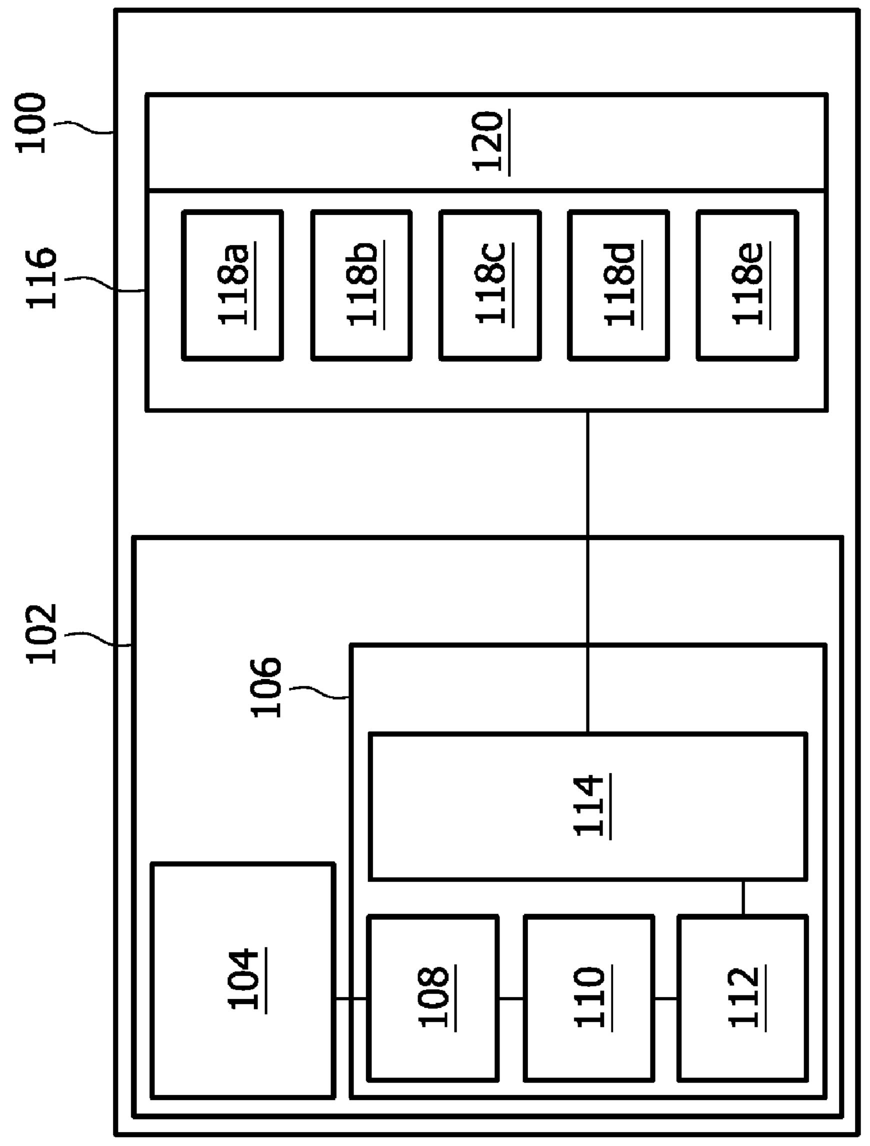
FIG. 1 is a schematic view of a system according to embodiments.

FIG. 1 illustrates a system 100 arranged for operating a lamp 116 according to embodiments of the present invention.

The system 100 comprises a device 102 for adjusting a color point of the lamp 116. The device 102 is comprised of a target color point definition unit 104, and an adjusting unit 106. The adjusting unit 106 comprises a permutation unit 108, a calculation unit 110, and an adding unit 112, as well as a control unit 114. The units 104-114 can cooperate with each other.

The control unit 114 can be arranged to control light sources 118*a*-*e*, in the lamp 116. The light sources 118*a*-*e*, may be solid-state light sources, such as LEDs. The light sources 118 are located within a housing of the lamp 116 and emit light through an optical system 120, such that the light emitted from the light sources 118*a-e* is superposed to provide an overall lighting impression of the lamp 116.

The operation of the system 100 will be described in more detail with reference to FIG. 2.

Figure 2:
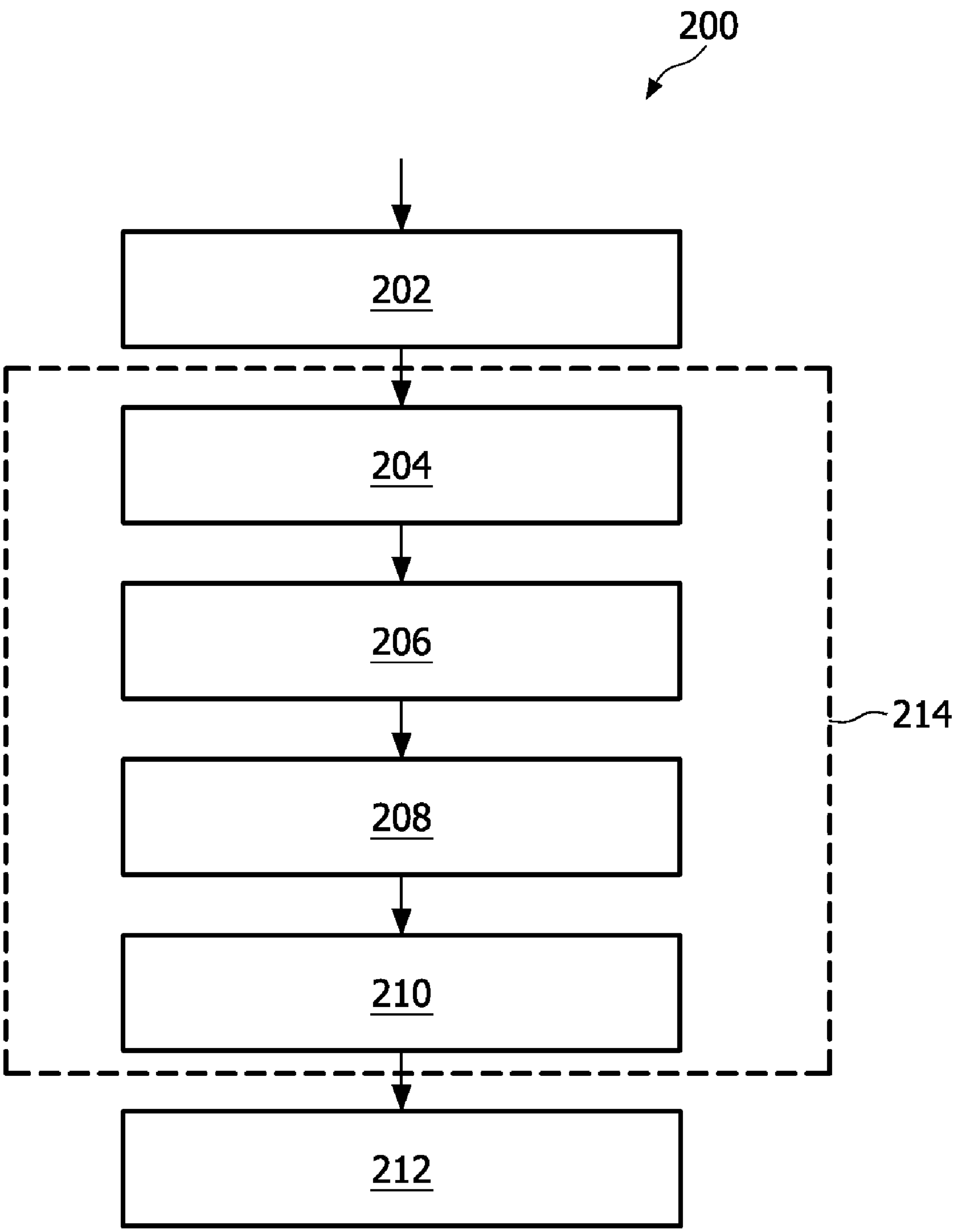
FIG. 2 is a flowchart of a method according to embodiments.

FIG. 2 illustrates a method 200 for operating the system 100 according to embodiments. In a first step 202, a color point is defined within the color point definition unit 104. This color point is the color which is desired for the lamp 116 and may be defined by its tristimulus values X, Y, Z. Other color point definition methods may also be within the scope of this patent application.

The defined color point is forwarded to adjusting unit 106. Permutation unit 108 calculates permutations in step 204. For example, as illustrated, five different light sources 118*a-e*, are provided in lamp 116, and the color point is defined by three tristimulus values. In this case, the permutation unit 108 may calculate $$\binom{5}{3}$$

permutations. This results in 10, possible triplets of light sources, as is illustrated in FIG. 3.

As can be seen in FIG. 3, ten permutation $T_1$-$T_{10}$, are provided, each of which comprises the contributions $D_A$, $D_B$, $D_C$, $D_D$, $D_E$. of the light sources 118*a-e*. For meeting the target color point, the average flux of each of the light sources 118*a-e*for each permutation can be calculated in step 206. In PWM based systems, for example, the average flux may be a function of the duty cycle of the light sources 118*a-e*within a certain time frame. For each permutation $T_1$-$T_{10}$, the duty cycles D of the three primary colors involved can be calculated in step 206.

The permutation unit 118 transfers the possible permutations to calculation unit 110. Calculation unit 110 calculates the contributions of each light source 118*a-e*, involved within a permutation $T_1$-$T_{10}$, in step 206. Calculation unit 110 further checks in step 208 whether the calculated duty cycle of the respective light source 118*a-e*, lies between 0, and 1. Only in this case can the target color point be met by operating the system 100 in a pulse width modulation with a fixed time frame.

In addition, calculation unit 110 checks whether the calculated duty cycles for each permutation cause the target color point to be emitted within the allowed color triangle defined by the tristimulus values in step 208. Only those permutations which meet both of the above requirements are considered for further processing.

FIG. 4*a*, illustrates an example of a different duty cycle for different permutations. As can be seen, calculation unit 110 has calculated for permutation $T_1$, the duty-cycles $D_{A1}$, $D_{B1}$, and $D_{C1}$, in a first virtual pulse width modulation cycle T/m. In a second cycle T/m, the contributions $D_{A4}$, $D_{C4}$, and $D_{D4}$. of permutation $T_4$. are calculated, and in a third cycle, the contributions $D_{A6}$, $D_{D6}$, $D_{E6}$. of permutation $T_6$. In the illustrated example, the calculation unit 110 has calculated in step 208 that only the permutations $T_1$, $T_4$, and $T_6$. provided a feasible target color point with feasible duty-cycles. Only these three permutations $T_1$, $T_4$, $T_6$, are accordingly considered for creating the target color point. These m (equal to three) permutations account for a virtual pulse width modulation cycle T/3, of the overall pulse width modulation cycle T.

The calculated permutations and their duty cycles are further processed in adding unit 112 in step 210. Adding unit 112 sums the duty-cycle $D_{A1}$, $D_{A4}$, $D_{A6}$. for light source 118*a*. For light source 118*b*, the overall contribution is $D_{B1}$. For light source 118*c*, the overall contribution is $D_{C1}+D_{C4}$. For light source 118*d*, the overall contribution is $D_{D4+DD6}$. For light source 118*e*, the overall contribution is $D_{E6}$. The overall contribution can be calculated by $$p_i = \frac{1}{m}\sum_{k=1}^{m} p_{ik}$$

With $p_i$. the overall contribution of a light source 118$_i$, and m the number of feasible permutations. As illustrated in FIG. 4*b*, the overall contributions can be summed into one overall duty cycle.

It may also be possible to use a weighting value $w_k$, to weight the calculate the contributions for the colors (0<=, $p_{ik}$<=1) and to add the weighted contributions. This would result in:

$$p_i = \sum_{k=1}^{m} w_i p_{ik} \text{ with } p_i = \frac{1}{m}\sum_{k=1}^{m} p_{ik}$$

The color rendering index may be improved by means of this weighting.

These summed duty cycles are transferred to control unit 114 in step 212. Control unit 114 operates the light sources 118*a-e*, in accordance with the respective summed contributions within one pulse width modulation cycle T. It is preferred that the overall contributions account for the operation time of a light source 118 within a cycle T.

It should be noted that the contribution $p_i$, may be used to calculate a constant current that may be applied to the light sources 118*a-e*. The flux-current characteristics render it possible to obtain a current value for driving the light sources 118*a-e*. It is not necessary to drive the light sources 118*a-e*, with pulse width modulation, a constant drive with the current value may also be possible. It is also possible to supply the light sources with the calculated contributions with a current which is varied around the required average flux.

The light output through optical system 120 of lamp 116 meets the target color point and has a high color-rendering index. The calculation of the contributions of more than three light sources 118 is easy to implement, and the method renders it possible to calculate the target color points with more than three primary light sources. This may be done using a pulse width modulated system.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless telecommunication systems. Any reference signs in the claims should not be construed as limiting the scope.

The invention claimed is

1. Method of adjusting a color point of a lamp comprising a plurality of N different light sources emitting light at different wavelengths, the method comprising the steps of:

(i) defining a target color point, (ii) operating the plurality of light sources within the lamp, wherein N≧3, and (iii) adjusting the contributions of M out of the N light sources to the overall light to be emitted by the lamp so as to meet said target color point, wherein the adjusting step comprises:

calculating $$\binom{N}{M}$$

permutations of combinations of light sources, calculating for at least two of the calculated permutations, the contributions of the light sources to the overall light emitted by the lamp to meet said target color point, adding up the calculated contributions of each light source from at least two of the calculated permutations into an overall contribution of each light source separately, and operating the lamp with the resulting overall contributions of all light sources.

2. The method of claim 1, wherein is equal to or greater than 4.

3. The method of claim 1, wherein the calculated contributions of the light sources are provided with respective weighting factors.

4. The method of claim 1, wherein calculating the contribution of the light sources for the calculated permutation comprises a calculation of a flux for each light source to meet the color point.

5. The method of claim 4, wherein calculating the flux comprises calculating a duration of activation for each light source.

6. The method of claim 5, further comprising checking whether the calculated duty cycle p is 0<=p <=1.

7. The method of claim 5, further comprising calculating a pulse width duty cycle for each light source within at least one of:

A) an identical time frame for each permutation

B) a non-identical time frame.

8. The method of claim 1, wherein calculating the flux comprises calculating a pulse width duty cycle for each light source.

9. The method of claim 1 , further comprising checking whether the calculated contribution for each light source lies within an allowed range defined by the color triangle of the color point.

10. The method of claim 1 wherein operating, the lamp with the overall contribution of all light sources comprises using a weighted superposition of the overall contributions of the light sources.

11. A device for operating a lamp lamp comprising a pluraitly of N different light sources emitting light at different wavelengths, the device comprising:

(i) a target color point definition unit, (ii) adjusting means for adjusting the contributions of M out of N different light sources to the overall light to be emitted by the lamp so as to meet said target color point, wherein N ≧3, (iii) permutation means arranged for calculating $$\binom{N}{M}$$

permutations of combinations of light sources, (iv)calculation means for calculating for at least two of the calculated permutations the contribution of the light sources to the overall light emitted by the lamp to meet said target color point, and (v) adding means for adding up the calculated contributions of each light source from at least two of the calculated permutations into an overall contribution of each light source separately.

12. A computer program product tangibly embodied in an information carrier, the computer program product comprising executable instructions that, when executed, cause at least one processor to perform operations comprising: operating N different light sources emitting light of different wavelengths within a lamp, wherein N≧3, adjusting the contributions of M out of the N light sources to the overall light to be emitted by the lamp so as to meet a target color point, wherein the adjusting comprises, calculating $$\binom{N}{M}$$

permutations of combinations of light sources, calculating for at least one of the calculated permutations the contributions of the light sources to the overall light emitted by the lamp to meet said target color point, adding up the calculated contributions of each light source from at least two of the calculated permutations into an overall contribution of each light source separately, and operating the lamp with the resulting overall contributions of all light sources.

* * * * *